United States Patent
Morse et al.

(10) Patent No.: US 9,800,030 B2
(45) Date of Patent: Oct. 24, 2017

(54) CONDUIT RECEIVERS

(71) Applicant: Cooper Technologies Company, Houston, TX (US)

(72) Inventors: Bradford James Morse, Syracuse, NY (US); Joseph Michael Manahan, Manlius, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/351,890

(22) Filed: Nov. 15, 2016

(65) Prior Publication Data

US 2017/0085068 A1 Mar. 23, 2017

Related U.S. Application Data (63) Continuation of application No. 14/300,018, filed on Jun. 9, 2014, now Pat. No. 9,551,445.

(51) Int. Cl.
*H02G 3/04* (2006.01)
*F16L 21/03* (2006.01)
(Continued)

(52) U.S. Cl.
CPC ............ *H02G 3/0481* (2013.01); *F16L 21/03* (2013.01); *F16L 21/08* (2013.01); *F16L 25/06* (2013.01);
(Continued)

(58) Field of Classification Search
CPC ......... H02G 3/06; H02G 3/0481; F16L 21/08; F16L 21/03; F16L 25/06
(Continued)

(56) References Cited

U.S. PATENT DOCUMENTS 3,109,052 A 10/1963 Dumire et al.
3,332,272 A 7/1967 Tonchen
(Continued)

FOREIGN PATENT DOCUMENTS

DE 19856766 7/2000
DE 10000868 7/2001
(Continued)

OTHER PUBLICATIONS

Cooper Industries Inc. Crouse-Hinds Division, Conduit Body Wire Pulling Instructions, IF964, Jun. 1993, pp. 1-2.
(Continued)

*Primary Examiner* — Sherman Ng
(74) *Attorney, Agent, or Firm* — King & Spalding LLP (57) ABSTRACT

Example embodiments are directed to an enclosure. The enclosure can include at least one wall forming a cavity. The enclosure can also include a conduit receiver disposed in the at least one wall. The conduit receiver can include a housing having an aperture, where the aperture is configured to receive a conduit. The conduit receiver can also include a retaining element disposed within the housing at a distal end of the housing. The conduit receiver can further include a sealing device disposed within the housing at a proximal end of the housing. The conduit receiver can also include a bushing adjacent to the proximal end of the housing, where the bushing extends radially inward from the at least one wall, where the bushing is configured to abut against the conduit when the conduit is received in the aperture, and where the bushing covers an end of the conduit.

20 Claims, 4 Drawing Sheets

(51) Int. Cl.
*F16L 21/08* (2006.01)
*F16L 25/06* (2006.01)
*H02G 3/06* (2006.01)
*H02G 1/00* (2006.01)
*H02G 15/013* (2006.01)

(52) U.S. Cl.
CPC ............ *H02G 1/00* (2013.01); *H02G 3/0406* (2013.01); *H02G 3/06* (2013.01); *H02G 15/013* (2013.01)

(58) Field of Classification Search
USPC ................................................ 174/68.1, 68.3
See application file for complete search history.

(56) References Cited

U.S. PATENT DOCUMENTS

| | | | |
|---|---|---|---|
| 3,596,939 A | 8/1971 | Gibson | |
| 3,686,747 A | 8/1972 | Bagnulo | |
| 3,703,303 A | 11/1972 | Eidelberg | |
| 3,744,007 A | 7/1973 | Horak | |
| 3,872,707 A | 3/1975 | Broske | |
| 3,895,177 A | 7/1975 | Muslin | |
| 3,993,333 A | 11/1976 | Biswas | |
| 4,019,762 A | 4/1977 | Eidelberg et al. | |
| 4,030,742 A | 6/1977 | Eidelberg et al. | |
| 4,170,125 A | 10/1979 | Minka | |
| 4,292,833 A | 10/1981 | Lapp | |
| 4,440,425 A | 4/1984 | Pate et al. | |
| 4,524,999 A | 6/1985 | Pate et al. | |
| 4,541,658 A * | 9/1985 | Bartholomew | F16L 37/0987 251/149.6 |
| 4,647,074 A * | 3/1987 | Pate | F16L 3/1236 285/154.2 |
| 4,846,506 A * | 7/1989 | Bocson | F16L 37/0987 285/27 |
| 4,921,456 A | 5/1990 | French | |
| 5,067,754 A * | 11/1991 | Bartholomew | F16L 37/0987 285/308 |
| 5,069,489 A | 12/1991 | Bartholomew | |
| 5,168,618 A | 12/1992 | Unewisse et al. | |
| 5,208,427 A | 5/1993 | Couto et al. | |
| 5,267,877 A | 12/1993 | Scannelli et al. | |
| 5,288,087 A | 2/1994 | Bertoldo | |
| 5,782,508 A * | 7/1998 | Bartholomew | F16L 37/0987 285/308 |
| 5,797,629 A | 8/1998 | Beagle | |
| 5,803,511 A | 9/1998 | Bessette | |
| 5,829,795 A | 11/1998 | Riesselmann | |
| 6,170,886 B1 | 1/2001 | Bartholomew | |
| 6,250,692 B1 * | 6/2001 | Ito | F16L 37/0987 285/319 |
| 6,450,549 B1 | 9/2002 | Schutz | |
| 6,753,470 B1 | 6/2004 | Johnson | |
| 6,805,385 B2 | 10/2004 | Viegener | |
| 6,843,096 B2 | 1/2005 | Viegener et al. | |
| 6,843,678 B2 | 1/2005 | DeWitt et al. | |
| 7,316,429 B2 | 1/2008 | Viegener | |
| 7,384,074 B2 | 6/2008 | He | |
| 7,644,959 B2 | 1/2010 | Guest | |
| 7,658,419 B2 | 2/2010 | Viegener et al. | |
| 7,690,693 B2 | 4/2010 | Moner et al. | |
| 7,841,630 B1 | 11/2010 | Auray et al. | |
| 8,202,130 B2 | 6/2012 | Friese et al. | |
| 8,205,915 B1 | 6/2012 | Crompton et al. | |
| 8,274,000 B2 | 9/2012 | Smith | |
| 8,308,201 B2 | 11/2012 | Duquette et al. | |
| 2007/0018450 A1* | 1/2007 | Golafshani | F16L 25/0036 285/23 |
| 2009/0026764 A1 | 1/2009 | Beckmann et al. | |
| 2009/0102184 A1 | 4/2009 | Lechner et al. | |
| 2010/0244436 A1 | 9/2010 | Mester | |
| 2011/0309611 A1 | 12/2011 | Smith | |
| 2011/0309614 A1 | 12/2011 | Guest | |
| 2012/0001414 A1 | 1/2012 | Arning et al. | |
| 2012/0161438 A1 | 6/2012 | Rischen et al. | |
| 2012/0174383 A1 | 7/2012 | Artaud et al. | |
| 2013/0082461 A1 | 4/2013 | Hunter | |

FOREIGN PATENT DOCUMENTS

| | | |
|---|---|---|
| DE | 20300918 | 4/2003 |
| DE | 10321300 | 12/2004 |
| EP | 1265018 | 12/2002 |
| EP | 1591176 | 11/2005 |
| EP | 2236889 | 10/2010 |
| EP | 2469142 | 6/2012 |
| JP | 2001208243 | 8/2001 |

OTHER PUBLICATIONS

Translation of JP2001208243 via LexisNexis Total Patents, 5 pages.
Translation of EP2469142 via LexisNexis Total Patents, 15 pages.
Translation of EP2236889 via LexisNexis Total Patents, 10 pages.
Translation of EP1265018 via LexisNexis Total Patents, 6 pages.
Translation of DE20300918 via LexisNexis Total Patents, 2 pages.
Translation of DE19856766 via LexisNexis Total Patents, 5 pages.
Translation of DE10321300 via LexisNexis Total Patents, 5 pages.
Translation of DE10000868 via LexisNexis Total Patents, 4 pages.
Translation of EP 1591176 via LexisNexis Total Patents, 6 pages.

* cited by examiner

CONDUIT RECEIVERS

CROSS-REFERENCE TO RELATED APPLICATIONS

This application is a continuation application of and claims priority under 35 U.S.C. §120 to U.S. patent application Ser. No. 14/300,018, titled "Conduit Receivers" and filed on Jun. 9, 2014, the entire contents of which are hereby incorporated herein by reference.

TECHNICAL FIELD

Embodiments of the invention relate generally to an enclosed raceway, and more particularly to systems, methods, and devices for conduit receivers of such an enclosed raceway.

BACKGROUND

Electrical conduit piping systems (also called enclosed raceway systems herein) are used to carry electrical wiring for power and/or communication. An electrical system (also called a cabling system herein) is one of many major systems in a facility (e.g., an industrial facility, a commercial building, a power plant). An electrical system is typically broad reaching, with electrical cables running throughout the facility. In some locations in a facility, a relatively large number of cables are run in a common area. In such a case, cables are laid in cable trays. In other locations in a facility, such as where specific electrical devices are located, a relatively small number of cables are run in a particular enclosed raceway within an enclosed raceway system. A facility often has a large number of enclosed raceways that make up an enclosed raceway system. An enclosed raceway can be rigid and/or flexible.

Enclosed raceways are sometimes run proximate to mechanical and plumbing systems of a facility. An enclosed raceway is often installed along a unique path, having one or more bends (e.g., 90° bends, 45° bends) and straight segments along the length of the enclosed raceway. As such, the path along which an enclosed raceway is installed is flexible. The flexible path of an enclosed raceway is needed to accommodate pre-existing objects (e.g., beams, plumbing, HVAC hardware, wall corners) in a facility. Enclosed raceways are often among the last components of an electrical system to be installed, and so there are likely a number of pre-existing objects around which an enclosed raceway must navigate. Consequently, the electrical enclosed raceways can require a lot of time and material to assemble.

Enclosed raceways provide protection to enclosed cables from impact, moisture, and chemical vapors. As such, conduit can be used to protect cables from being crushed, which can result in a fault condition. Rigid conduit is made in fixed lengths, and so a person (usually an electrician) installing rigid conduit as part of a enclosed raceway may have to perform a number of tasks with respect to the rigid conduit and associated fittings. For example, the installer may have to cut a length of conduit to size, shape a conduit pipe according to a particular curvature required based on the path to be followed, etch mating threads into the conduit, and connect the conduit with one or more fittings to accommodate the path of the enclosed raceway.

In an enclosed raceway system, conduit pipe can be joined to another component (e.g., another conduit pipe, a connector, a junction box, a motor control center, a switchgear cabinet, a control cabinet) using fittings. Such fittings can provide a connection and/or a change in direction. Failure to provide proper joints can cause discontinuity in the enclosed raceway system. Conduit pipe in such cases can be joined using mating threads. Even if a conduit pipe has mating threads disposed on each end, when a conduit pipe is cut to size, mating threads must be etched into the end of the conduit pipe. This process can be messy (leaving, for example, metal shavings, and oil stains) and time consuming. In addition, when conduit pipes are joined by mating threads in a hazardous or explosion-proof application, a flame path formed by the mating threads can be compromised by burrs that result from etching the mating threads into the conduit. The burrs can also damage cable, especially as the cable is being pulled in a cabling system.

SUMMARY

In general, in one aspect, the disclosure relates to an enclosure. The enclosure can include one or more walls forming a cavity and a first conduit receiver disposed in the at least one wall. The first conduit receiver can include a first housing having a first aperture, where the first aperture is configured to receive a first conduit. The first conduit receiver can also include a first retaining element disposed within the first housing at a first distal end of the first housing. The first conduit receiver can further include a first sealing device disposed within the first housing at a first proximal end of the first housing. The first conduit receiver can also include a first bushing adjacent to the first proximal end of the first housing, where the first bushing extends inward from the at least one wall, where the first bushing is configured to abut against the first conduit when the first conduit is received in the first aperture, and where the first bushing covers a first end of the first conduit.

In another aspect, the disclosure can generally relate to a coupling device that includes a body having a cavity that traverses therethrough, where the body comprises a first end. The first end of the body of the coupling device can include a first housing having a first aperture, where the first aperture is configured to receive a first conduit. The first end of the body of the coupling device can also include a first retaining element disposed within the first housing at a first distal end of the first housing. The first end of the body of the coupling device can further include a first sealing device disposed within the first housing at a first proximal end of the first housing. The first end of the body of the coupling device can also include a first bushing adjacent to the first proximal end of the first housing, where the first bushing extends inward from the at least one wall, where the first bushing is configured to abut against the first conduit when the first conduit is received in the first aperture, and where the first bushing covers a first end of the first conduit.

In yet another aspect, the disclosure can generally relate to a system. The system can include a first conduit having a first conduit end, and an enclosure coupled to the first conduit end of the first conduit. The enclosure of the system can include at least one wall forming a cavity, and a first conduit receiver disposed in the at least one wall. The first conduit receiver of the enclosure of the system can include a first housing having a first aperture, where the first aperture receives the first conduit end of the first conduit. The first conduit receiver of the enclosure of the system can also include a first retaining element disposed within the first housing at a first distal end of the first housing. The first conduit receiver of the enclosure of the system can further include a first sealing device disposed within the first housing at a first proximal end of the first housing. The first conduit receiver of the enclosure of the system can also include a first bushing adjacent to the first proximal end of the first housing, where the first bushing extends inward from the at least one wall, where the first bushing abuts against and covers a distal end of the first conduit end. The system can also include a tool that applies a compressive force to the first housing of the first conduit receiver, where the compressive force deforms the first housing and drives the first retaining element against the first conduit end.

These and other aspects, objects, features, and embodiments will be apparent from the following description and the appended claims.

BRIEF DESCRIPTION OF THE DRAWINGS

The drawings illustrate only example embodiments of conduit receivers and are therefore not to be considered limiting of its scope, as conduit receivers may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, apparatuses, and methods of conduit receivers. While the example conduit receivers shown in the Figures and described herein are directed to conduit for electrical cable (sometimes referred to herein as "cable"), example conduit receivers can also be used with other devices aside from conduit for electrical cable, including but not limited to pipe for gases, pipe for fluids, and pipe for structural purposes (e.g., shelving, frames). Example embodiments can also be used with other devices, including but not limited to junction boxes, drain hubs, ground nuts, caps, and adapters. Thus, the examples of conduit receivers described herein are not limited to conduit for electrical cables.

As used herein, the term "coupling" (or variations thereof) can be used interchangeably with the term "connecting" (or variations thereof). These words and their variations are intended to describe how example embodiments are physically joined with one or more other components of an enclosed raceway system. As described herein, a user can be any person that interacts with example conduit receivers or a portion thereof. Examples of a user may include, but are not limited to, an engineer, an electrician, a maintenance technician, a mechanic, an operator, a consultant, a contractor, a homeowner, and a manufacturer's representative.

The conduit receivers described herein can be physically placed in outdoor environments. In addition, or in the alternative, example conduit receivers can be subject to extreme heat, extreme cold, moisture, humidity, high winds, dust, and other conditions that can cause wear on the conduit receivers or portions thereof. In certain example embodiments, the conduit receivers, including any portions thereof, are made of materials that are designed to maintain a long-term useful life and to perform when required without mechanical failure.

Example conduit receivers described herein, as part of an enclosed raceway system, can be subject to meeting one or more of a number of standards. For example, the National Electric Code ("NEC") sets standards for electrical wiring of an electrical system. As a specific example, the NEC requires that installations of electrical wiring is performed "in a neat and workmanlike manner." To enhance electrical safety, an installer creates enclosed raceways that protect electrical cable from mechanical abuse and provide electrical continuity of the electrical system.

The NEC also sets standards for electrical cable pulling access and grounding practices. For example, suitable cable pulling access is required before having a total of 360 degrees of bend of an enclosed raceway. This reduces the strain on electrical cables created by pulling the electrical cable through a portion of the enclosed raceway. This also reduces or prevents damage to the insulation or conductors of an electrical cable being pulled through the enclosed raceway. As another example, NEC standards require a permanent and continuous path to ground.

Underwriters Laboratories tests and approves (in industry terms, "lists") fittings (e.g., conduit, connectors, couplers) for enclosed raceway systems. Using appropriate UL listed fittings for an enclosed raceway, along with good installation workmanship, are important for ensuring electrical safety. The American National Standards Institute (ANSI) and the National Electrical Manufacturers Association (NEMA) also publish a number of standards that apply to enclosed raceways. For example, ANSI/NEMA FB 1 are standards that apply to fittings, cast metal boxes and conduit bodies for conduit, electrical metallic tubing, and cable.

Example embodiments of conduit receivers will be described more fully hereinafter with reference to the accompanying drawings, in which example embodiments of conduit receivers are shown. Conduit receivers may, however, be embodied in many different forms and should not be construed as limited to the example embodiments set forth herein. Rather, these example embodiments are provided so that this disclosure will be thorough and complete, and will fully convey the scope of conduit receivers to those of ordinary skill in the art. Like, but not necessarily the same, elements (also sometimes called modules) in the various figures are denoted by like reference numerals for consistency.

Terms such as "first," "second," "distal," and "proximal" are used merely to distinguish one component (or part of a component or state of a component) from another. Such terms are not meant to denote a preference or a particular orientation. Any feature and/or component shown and/or described in one embodiment (e.g., in a figure) herein can be used in any other embodiment (e.g., in any other figure) herein, even if not expressly shown and/or described in such other embodiment.

Figure 1:
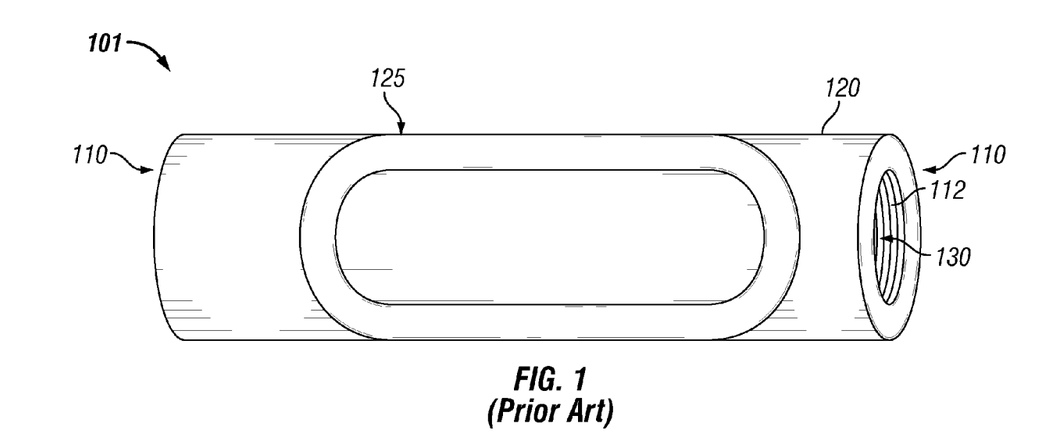
FIG. 1 shows an enclosure with conduit receivers currently known in the art.

FIG. 1 shows an outlet box, or more generally referred to as an enclosure, 101 with conduit receivers 110 currently known in the art. The enclosure 101 includes at least one wall 120 that forms a cavity 130. The wall 120 can have an aperture (hidden from view) that traverses therethrough and is normally covered by a cover 125. The wall 120 and the cover 125 can be made of one or more of a number of suitable materials, including but not limited to steel, plastic, and ceramic.

The enclosure 101 can also have one or more (in this case, two) conduit receivers 110 (referred to herein as traditional conduit receivers). Each traditional conduit receiver 110 of FIG. 1 has mating threads 112 disposed on its inner or outer surface at the distal end of each traditional conduit receiver 110. Each traditional conduit receiver 110 has a cross-sectional shape that is substantially circular and has a size that is substantially similar to the size (e.g., a trade size, including but not limited to ½ inch, 1½ inch, 2 inch, and 6 inch) of a conduit. Such a conduit has mating threads that complement the mating threads 112 of the traditional conduit receiver 110 and allow the conduit to couple to the traditional conduit receiver 110 of the enclosure 101.

Figure 2A:
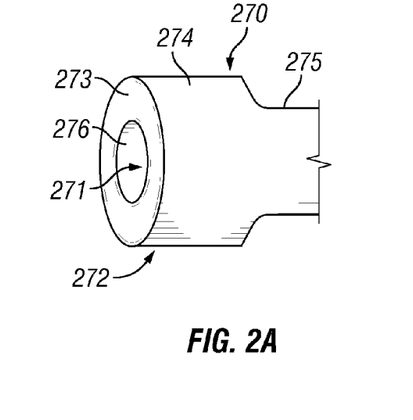
FIGS. 2A and 2B show various views of a conduit receiver in accordance with certain example embodiments.
Figure 2B:
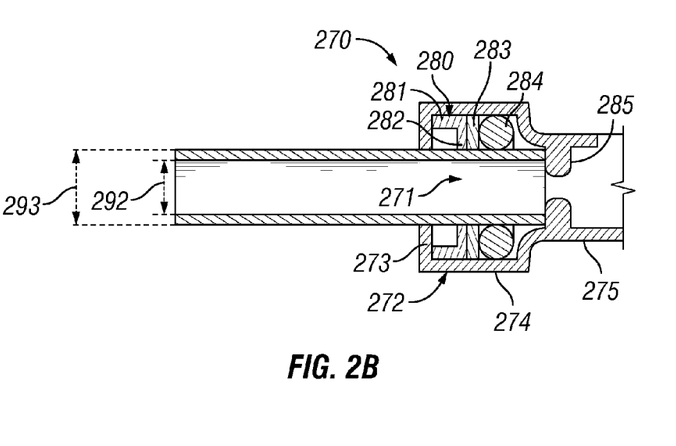

FIGS. 2A and 2B show various views of an example conduit receiver 270 in accordance with an example embodiment of the invention. Specifically, FIG. 2A shows a front-side perspective view of the conduit receiver 270, and FIG. 2B shows a cross-sectional side view of the conduit receiver 270. In one or more embodiments, one or more of the components shown in FIGS. 2A and 2B may be omitted, added, repeated, and/or substituted. Accordingly, embodiments of conduit receivers should not be considered limited to the specific arrangements of components shown in FIGS. 2A and 2B.

Referring to FIGS. 2A and 2B, the example conduit receiver 270 can include a housing 272, at least one retaining element 280, at least one optional separating member 283, a sealing device 284, and at least one bushing 285. The housing 272 can include at least one wall. In this case, housing 272 has a main wall 274, an end wall 273 disposed at the distal end of the main wall 274, and a transition wall 275 disposed at the proximal end of the main wall 274.

The end wall 273 can be at some angle (in this case, substantially perpendicular) to the main wall 274. The transition wall 275 can provide a transition between the conduit receiver 270 and some other component (e.g., an enclosure, another conduit receiver) to which the conduit receiver 272 is coupled. The transition wall 275 can be straight, curved, and/or have some other feature along its length. The outer perimeter of the transition wall 275 can change along its length. For example, in this case, the outer perimeter of the transition wall 275 decreases along its length from its distal end (where the transition wall 275 meets the main wall 274) to the proximal end (where the transition wall 275 meets the component to which the conduit receiver 270 is coupled).

The housing 272 can form a cavity 271 that traverses its length. The shape and size of the cavity 271 can be defined at the distal end of the housing 272 by the opening formed by the end wall 273. In this case, the opening 276 formed by the end wall 273 is substantially circular and has an outer perimeter, defined by diameter 293. Similarly, the shape and size of the cavity 271 can be defined at the proximal end of the housing 272 by the opening formed by the bushing 285.

The bushing 285, sometimes called an integral bushing 285, provides a smooth surface for electrical cables when the electrical cables pulled through the conduit receiver 270 and/or an adjacent component (e.g., conduit, junction box) of the enclosed raceway. The bushing 285 is not a conduit end stop. As it is not necessary that the conduit be inserted flush against this bushing to assure a secure joint. In this case, the opening formed by the bushing 285 is substantially circular and has an outer perimeter, defined by diameter 292. The shape and size of the aperture 276 formed by the end wall 273 can be substantially the same as, or slightly larger than, the shape and size of the conduit that is disposed therein. Thus, rather than working with only a single size of conduit, as is the case of traditional conduit receivers, the example conduit receiver 270 can be used with a conduit that falls within a range of sizes. The diameter 292 can be less than the diameter 293.

In certain example embodiments, the housing 272 is made of one or more of a number of materials that make the housing 272 malleable. Thus, when a compressive force is applied to the main wall 274 (and/or some other portion) of the housing 272, the main wall 274 becomes compressed and deformed. When this occurs, as shown below with respect to FIG. 3B, the components (e.g., the retaining element 280, the sealing device 284) positioned within the housing and outside the conduit become affected.

One or more of the various walls (e.g., main wall 274, end wall 273, transition wall 275) of the housing 272 can be continuous around the outer perimeter, as shown in FIG. 2A. Alternatively, one or more of the walls of the housing 272 can be segmented, having breaks along a wall that can run length-wise, circumferentially, and/or in any other direction. In such a case, the breaks can run along part of all of a wall. In addition, or in the alternative, the break can be a variation in the thickness of a wall rather than a gap in the wall. Such features can be included in one or more walls of the housing 272 for one or more reasons, including but not limited to ease and/or control of compressibility of such walls.

At least one retaining element 280 can be used to become embedded into the wall of the conduit when one or more walls of the conduit receiver 270 is compressed and deformed. When this occurs, each retaining element 280 maintains the conduit in a fixed position relative to the conduit receiver 270. A conduit receiver 270 can include a single retaining element 280 disposed over some or all of the outer perimeter of the conduit and/or the housing 272. Alternatively, a conduit receiver 270 can include multiple retaining elements 280 having a finite length that are disposed continuously, regularly, randomly, and/or in some other pattern around the outer perimeter of the conduit and/or the housing 272. In other words, a retaining element 280 of a conduit receiver 270 can be one or more pieces that are disposed around some or all of the outer perimeter of the conduit and/or the housing 272. The retaining element 280 can be disposed at one or more locations along the length of the housing 272. For example, in this case, the retaining element 280 is disposed at the distal end of the housing 272, adjacent to the end wall 273.

Each retaining element 280 can have one or more portions. For example, as shown in FIG. 2B, the retaining element 280 can have a base 281 and a main portion 282. The base 281 can be used to align with and abut against the inner surface of the main wall 274 and/or the inner surface of the end wall 273. The base 281 can have a length that is less than the length of the main wall 274. The main portion 282 can be oriented to be substantially perpendicular to a conduit disposed within the cavity 271 of the conduit receiver 270. Thus, if the main wall 274 is substantially parallel to the conduit disposed within the cavity 271, then the base 281 of the retaining element 280 is substantially parallel to the conduit, and the main portion 282 is substantially perpendicular to both the base 281 and the conduit. The distal end of the main portion 282 can have a pointed end and/or some other feature that will allow the main portion 282 be become embedded into the wall of the conduit.

Each retaining element 280 (or at least the main portion 282 of a retaining element 280) can be made of one or more of a number of materials that is harder than the material of the conduit. In this way, the main portion 282 of the retaining element 280 can effectively deform (e.g., penetrate) at least a portion of the conduit rather than become deformed (or at least substantially deformed) itself. If the deformation of the conduit includes penetration by the main portion 282 of the retaining element 280 into the conduit wall, then the main portion 282 without successfully penetrating at least a portion the conduit. In some cases, all portions of a retaining element 280 are made of the same material or mixture of materials. If there are multiple retaining elements 280, each retaining element 280 can be made of the same material or mixture of materials compared to the rest of the retaining elements 280.

In certain example embodiments, the sealing device 284 creates a seal between the housing 272 and the conduit when some or all of the housing 272 is compressed and deformed by a compressive force (a press fitting). The sealing device 284 can be disposed at one or more locations along the length of the housing 272. For example, in this case, the sealing device 284 is disposed at the proximal end of the housing 272, adjacent to the transition wall 275. The sealing device 284 can be at least partially elastic so that the sealing device 284 can be compressed to fit the shape between the housing 272 and the conduit when the housing 272 is compressed and deformed. In this example, in addition to the conduit, the main wall 274, the transition wall 275, and the separating member 283 (or, in the absence of the separating member 283, the retaining element 280) can abut against and shape the sealing device 284 when the housing 272 is compressed and deformed.

The cross-sectional shape of the sealing device 284 (in a normal or uncompressed state) can be one or more of a number of shapes, including but not limited to circular (as shown in FIG. 2B), oval, square, rectangular, triangular, and octagonal. The height of the sealing device 284 can be equal to or different than (in this case, less than) the length of the main portion 282 of the retaining element 280. When the height of the sealing device 284 is equal to or less than the length of the main portion 282 of the retaining element 280, the sealing device 284 does not impede the insertion of the conduit into the cavity 271. The sealing device 284 can be made from one or more of a number of materials, including but not limited to rubber, plastic, and an elastomer. Examples of a sealing device 284 can include an o-ring and a gasket. The sealing device 284 can be disposed within some or all of the housing 272 in a single, continuous piece or in multiple pieces.

The optional separating member 283, when used, can be disposed within the housing between the retaining element 280 and the sealing device 284. The separating member 283 (e.g., a washer) can be used to help align the retaining element 280 and/or compress the sealing device 284 when the housing 272 is compressed and deformed. In certain example embodiments, the separating member 283 can also prevent friction of the sealing device 284 from introducing torque on the retaining element 280 when the housing 272 is compressed and deformed. By using the separating member 283 to keep the retaining element 280 substantially stationary, the effectiveness of the deformation of the conduit 250 by the retaining element 280 can be increased during compression and/or deformation of the housing 272. The separating member 283 can be disposed within some or all of the housing 272 in a single, continuous piece or in multiple pieces. The separating member 283 can be made of one or more materials that are rigid or flexible. In certain example embodiments, the separating member 283 substantially retains its shape (is not significantly compressed) when the housing 272 is compressed and deformed.

The height of the separating member 283 can be substantially the same as or less than the height of the sealing device 284 when the sealing device 284 is in a compressed state. In this way, the separating member 283 does not inhibit the sealing device 284 from creating a seal when the housing 272 is compressed and deformed. The cross-sectional shape of the separating member 283 can be one or more of a number of shapes, including but not limited to circular, oval, square (as shown in FIG. 2B), rectangular, triangular, and octagonal.

In certain example embodiments, the bushing 285 is used to protect electrical cable that is pulled through the cavity 271 of the conduit receiver 270 from being damaged by the proximal end of the conduit, which can have sharp and/or jagged edges, disposed within the cavity 271. The bushing 285 can extend inward from the transition wall 275 toward the cavity 271. Some or all of the distal portion of the bushing 285 can abut against some or all of the proximal end of the conduit. Further, the height of the bushing 285 can be substantially the same as, or greater than, the thickness of the conduit. In such a case, the distal end of the bushing 285 can cover the proximal end of the conduit.

The proximal end and at least the top portion of the distal end of the bushing 285 can have a rounded surface to increase the ease with which one or more electrical cables can be pulled through the cavity 271 of the conduit receiver 270. The bushing 285 can be disposed within some or all of the housing 272 in a single, continuous piece or in multiple pieces. The bushing 285 can be made of one or more materials that are rigid or flexible, but that tend to offer little or no resistance to an electrical cable when the electrical cable slides across the bushing 285. The bushing 285 can be formed from a single piece with the rest of the transition wall 275, as from a mold. Alternatively, the bushing 285 can be one or more separate pieces that are mechanically coupled to the inner surface of the transition wall 275. In such a case, the bushing 285 can be coupled to the transition wall 275 using one or more of a number of coupling methods, including but not limited to welding, epoxy, fastening, and compression fittings.

Figure 3A:
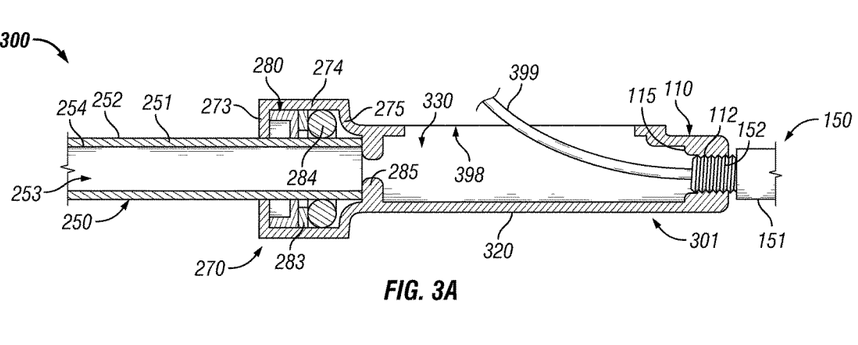
FIG. 3A shows a system that includes an enclosure with a conduit receiver prior to securing a conduit in accordance with certain example embodiments.
Figure 3B:
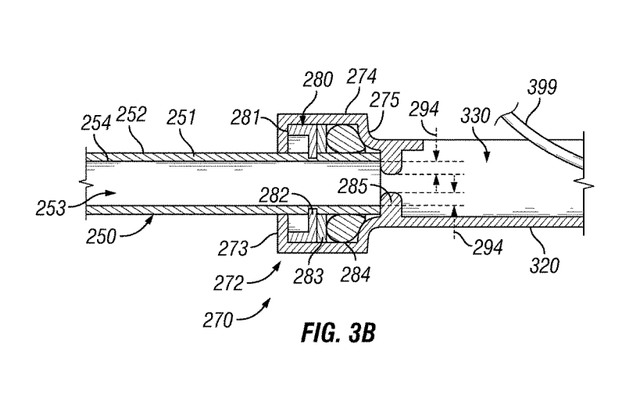
FIG. 3B shows the system of FIG. 3A after the conduit receiver secures the conduit in accordance with certain example embodiments.

FIG. 3A shows a conduit system 300 that includes an enclosure 301 that includes the conduit receiver 270 of FIGS. 2A and 2B prior to securing a conduit 250 in accordance with certain example embodiments. FIG. 3B shows the conduit system 302 of FIG. 3A after the conduit receiver 270 secures the conduit 250 in accordance with certain example embodiments. In one or more embodiments, one or more of the components shown in FIGS. 3A and 3B may be omitted, added, repeated, and/or substituted. Accordingly, embodiments of conduit systems having conduit receivers should not be considered limited to the specific arrangements of components shown in FIGS. 3A and 3B.

The description for any component (e.g., main wall 274, separating member 283) of FIGS. 3A and 3B not provided below can be considered substantially the same as the description given for such component provided above with respect to FIGS. 2A and 2B. Referring to FIGS. 1-3B, the enclosure 301 of FIG. 3A includes a traditional conduit receiver 110, as described above with respect to FIG. 1, and an example conduit receiver 270. In this case, the conduit receiver 110 and the conduit receiver 270 are integrated as part of, and disposed at opposite ends of, the enclosure 301.

The enclosure 301 can be one or more of a number of different enclosures. Examples of such enclosures can include, but are not limited to, a fitting, a connector, a junction box, a motor control center, a switchgear cabinet, a control cabinet. In this example, with the enclosure 101 of FIG. 1, the enclosure 301 is a CONDULET™ (CONDULET is a trademark of Cooper Industries, Inc. of Houston, Tex.)

In this case, the cover of the enclosure 301 is removed, exposing the aperture 398 in the wall 320 of the enclosure 301 as well as the cavity 330 within the enclosure 301. This allows the electrical cable 399 to be accessed and pulled through the conduit 150 and/or the conduit 250. For example, the electrical cable 399 can be trained through the aperture 398 by looping the electrical cable 399 (sometimes called a "training loop") in a "circle" outside the enclosure 301. This ensures the reliability of the electrical cable 399 pulled through the enclosure 301 by using the "training loop" in the aperture 398 to safely guide the electrical cable 399 while pulling the electrical cable 399 across multiple bends and/or a distance through components of the enclosed raceway adjacent to the enclosure 301. An explanation of this electrical cable pulling method is described in a publication called "Conduit Body Wire Pulling Instructions" by Crouse-Hinds, publication number IF964, revision 6/93, copyrighted in 1993 by Cooper Industries, Inc., the entirety of which is incorporated by reference herein.

In FIG. 3A, a conduit 150 with conduit wall 151 has mating threads 152 disposed on its proximal end. These mating threads 152 are complementary to the mating threads 112 disposed on the inner surface of the traditional conduit receiver 110. As a result, the conduit is threadably coupled to the conduit receiver 110 of the enclosure 301, as currently known in the art. Adjacent to the mating threads 152 of the conduit wall 151, a bushing 115 can be disposed. The bushing 115 can be substantially the same as the busing 285 described above. At the opposite end of the enclosure 301, a conduit 250 with conduit wall 251 has no mating threads or any other coupling feature disposed on its proximal end.

Instead, the proximal end of the conduit 250 is disposed within the cavity 271 of the example conduit receiver 270 and inserted inward until the proximal end of the conduit 250 abuts against the distal end of the bushing 285. In certain example embodiments, the proximal end of the conduit 250 does not physically abut against, but is disposed proximate to, the distal end of the bushing 285. In either case, a secure joint can be formed between the conduit 250 and the conduit receiver 270 sufficient to meet applicable standards. The proximal end of the conduit 250 can be smooth, without rough edges. Alternatively, and more likely, the proximal end of the conduit 250 has rough edges, either in its manufactured state or when being cut to size by a user. As a result, the example conduit receiver 270 can reduce or eliminate the likelihood of damage occurring to the electrical cable 399 caused by the proximal end of the conduit 250 when the electrical cable 399 is pulled through the conduit receiver 270.

In this case, the height of the bushing 285 exceeds the thickness of the conduit wall 252 (i.e., the distance between the outer surface 252 of the conduit wall 252 and the inner surface 254 of the conduit wall 252) by a distance 294. Since the distance 294 is positive (the height of the bushing 285 exceeds the thickness of the conduit wall 252) and since the top side of the bushing is rounded, the electrical cable 399 can be pulled through the cavity 253 of the conduit 250 (which is disposed within the cavity 271 of the conduit receiver 270) without the electrical cable 399 contacting the proximal end of the conduit 250. In other words, any rough edges to the proximal end of the conduit 270 do not contact the electrical cable 399, reducing or preventing damage that can be caused when the electrical cable 399 is pulled through the conduit receiver 270.

In FIG. 3B, a tool (not shown) has been used to apply a compressive force to the conduit receiver 270. Specifically, a compressive force is applied to the main wall 274 of the conduit receiver 270. When this occurs, the main wall 270 is forced inward toward the conduit 250, deforming the walls of the conduit receiver 270. Consequently, the main portion 282 of the retaining element 280 is driven against (deforms) the conduit wall 251 of the conduit 250. For this to occur, the compressive force must exceed a threshold compressive force, which is defined by the strength of the conduit wall 251 of the conduit 250 relative to the strength of the main portion 282 of the retaining element 280.

The tool used to apply the compressive force can be one or more of a number of devices. The tool can be an off-the-shelf product or a custom-made product that is specifically designed for the conduit receiver 270. The tool can apply the compressive force at one location along the outer perimeter of the conduit receiver 270, at multiple locations along the outer perimeter of the conduit receiver 270, or uniformly around the entire outer perimeter of the conduit receiver 270.

Further, as described above with respect to FIGS. 2A and 2B, when one or more of the walls of the conduit receiver 270 are compressed and deformed by the application of a compressive force that exceeds the threshold compressive force, the sealing device 284 also becomes compressed and deformed. In other words, as shown in FIG. 3B, the sealing device 284 is compressed within the housing 272 to form a seal against the outer surface 252 of the conduit wall 251, the separating member 283 (present in this example), a portion of the inner surface of the transition wall 275, and a portion of the inner surface of the main wall 274. Between the seal formed by the sealing device 284 and the deformation (e.g., penetration) of the conduit wall 251 by the main portion 282 of the retaining element 280, the conduit 250 is secured within the conduit receiver 270.

In certain example embodiments, since the conduit wall 251 of the conduit 250, the retaining element 280, and at least a portion of the housing 272 of the conduit receiver 270 are electrically conductive (e.g., metallic), a solid grounding connection is made between the conduit 250 and the conduit receiver 270. In cases where an enclosure (e.g., enclosure 301) is made of an electrically conductive material, the enclosure can also be part of the solid grounding connection. This proper grounding is often required to meet applicable codes and/or standards for conduit, enclosed raceway, and/or wiring systems to reduce or eliminate the possibility of fires, explosion, overheating, and other adverse electrical conditions that can arise from improper grounding of wiring and related equipment.

Figure 4:
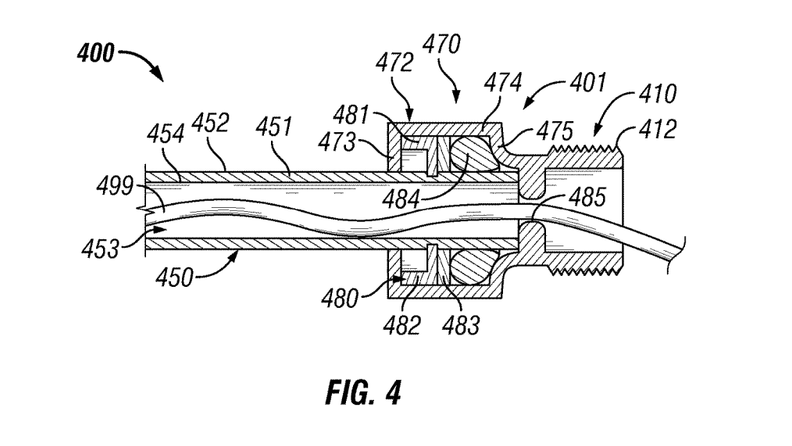
FIG. 4 shows a system that includes a conduit connector device in accordance with certain example embodiments.

FIG. 4 shows a conduit system 400 that includes a conduit connector device 401 in accordance with certain example embodiments. In one or more embodiments, one or more of the components shown in FIG. 4 may be omitted, added, repeated, and/or substituted. Accordingly, embodiments of conduit systems having conduit connector devices should not be considered limited to the specific arrangements of components shown in FIG. 4.

The description for any component (e.g., housing 472, bushing 485) of FIG. 4 not provided below can be considered substantially the same as the description of the corresponding component (e.g., housing 272, bushing 285) described above with respect to FIGS. 2A-3B. The numbering scheme for the components of FIG. 4 parallels the numbering scheme for the components of FIGS. 2A-3B in that each component is a three digit number, where components of the conduit system 400 of FIG. 4 and the corresponding components of the conduit receiver 270 of FIGS. 2A and 2B, the conduit system 300 of FIG. 3A, and the conduit system 302 of FIG. 3B have the identical last two digits.

Referring to FIGS. 1-4, the conduit connector device 401 (also sometimes called a conduit coupling device 401) of FIG. 4 can be an abbreviated version of the enclosure 301 of FIGS. 3A and 3B. Specifically, the conduit connector device 401 does not have a wall forming a cavity, as with the wall 320 of the enclosure 301. Instead, the conduit connector device 401 can have an example conduit receiver 470 at one end, and a traditional conduit receiver 410 (in this case, mating threads 412 disposed on the inner or outer surface) adjacent to the conduit receiver 470 at the other end of the coupling device 401. FIG. 4 also shows how the bushing 485 protects the electrical cable 499 from the proximal end of the conduit wall 451 of the conduit 450.

Alternatively, the conduit connector device 401 of FIG. 4 can be a replacement for some or all of an existing connector device. Examples of such existing connector devices can include, but are not limited to, a drain hub, a ground nut, a union, an elbow, a cap, and an adapter. In such cases, the conduit connector device 401 can be coupled (connected) to an enclosure (e.g., a junction box, a control cabinet, a motor control center) other than another conduit.

Figure 5:
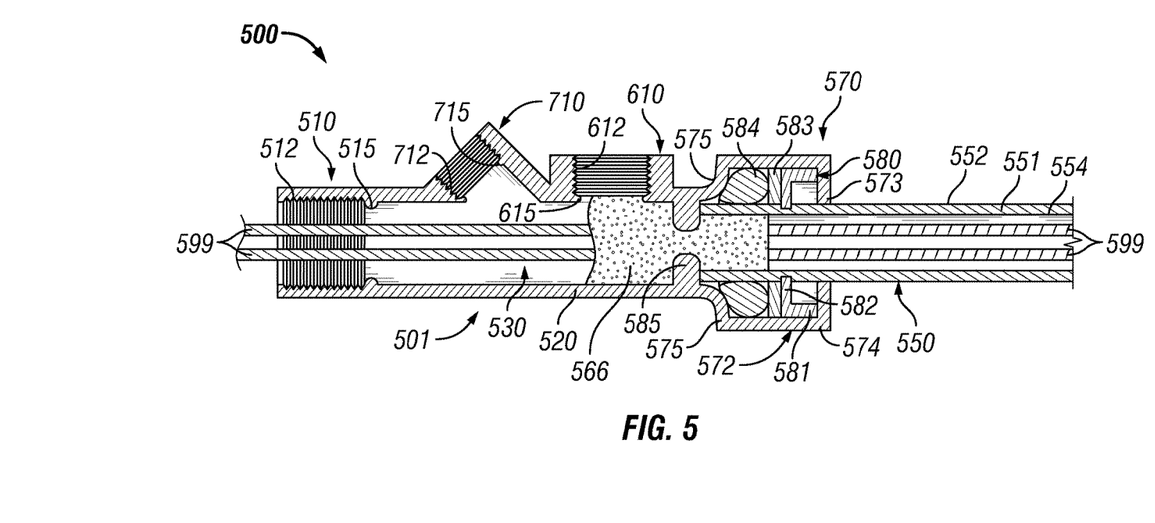
FIG. 5 shows a system that includes an explosion-proof enclosure with a conduit receiver in accordance with certain example embodiments.

FIG. 5 shows a conduit system 500 that includes an explosion-proof enclosure 501 with a conduit receiver 570 in accordance with certain example embodiments. In one or more embodiments, one or more of the components shown in FIG. 5 may be omitted, added, repeated, and/or substituted. Accordingly, embodiments of conduit systems having example conduit receivers should not be considered limited to the specific arrangements of components shown in FIG. 5.

The description for any component (e.g., housing 572, bushing 585) of FIG. 5 not provided below can be considered substantially the same as the description of the corresponding component (e.g., housing 272, bushing 285) described above with respect to FIGS. 2A-3B. The numbering scheme for the components of FIG. 5 parallels the numbering scheme for the components of FIGS. 2A-3B in that each component is a three digit number, where components of the conduit system 500 of FIG. 5 and the corresponding components of the conduit receiver 270 of FIGS. 2A and 2B, the conduit system 300 of FIG. 3A, and the conduit system 302 of FIG. 3B have the identical last two digits.

Referring to FIGS. 1-5, the conduit system 500 of FIG. 5 includes an enclosure 501 that has three traditional conduit receivers (conduit receiver 510, conduit receiver 610, and conduit receiver 710) and one example conduit receiver 570 disposed in various portions of the wall 520 of the enclosure 501. The enclosure 501 can have a different (e.g., zero, one, two, four) number of traditional conduit receivers and/or a different (e.g., zero, two, three, four) number of example conduit receivers.

In some cases, an enclosure (e.g., enclosure 501) is required to meet certain standards and/or regulations with respect to arresting flames and/or explosions. Such an enclosure can be called, for example, an explosion-proof enclosure or a flame-proof enclosure (generally called herein an explosion-proof enclosure). An explosion-proof enclosure is an enclosure that is configured to contain an explosion or flame that originates inside the enclosure or propagates to the enclosure. Further, an explosion-proof enclosure can be configured to allow gases from inside the enclosure to escape across joints of the enclosure and cool as the gases exit the enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface (as in this case for the traditional conduit receivers), and a serrated surface.

As mentioned above, an explosion-proof enclosure can be subject to meeting certain standards and/or requirements. For example, The National Electrical Manufacturers Association (NEMA) sets standards with which an enclosure must comply in order to qualify as an explosion-proof enclosure. For example, a NEMA Type 7 standard applies to enclosures constructed for indoor use in certain hazardous locations. Hazardous locations may be defined by one or more of a number of authorities, including but not limited to the NEC (e.g., Class 1, Division I) and Underwriters' Laboratories, Inc. (UL) (e.g., UL 1203). For example, a Class 1 hazardous area under the NEC is an area in which flammable gases or vapors may be present in the air in sufficient quantities to be explosive.

Traditional conduit receivers (conduit receiver 510, conduit receiver 610, and conduit receiver 710) have mating threads that, when coupled to complementary mating threads of a conduit, can allow the traditional coupling receiver to comply with such standards. Alternatively, when a conduit receiver is coupled to a conduit using coupling means other than mating threads, in order for an example conduit receiver (e.g., conduit receiver 570) to comply with such standards, a sealing compound 566 can be added to the cavity 530 of the enclosure 501, at least in the portion of the cavity 530 adjacent to where the conduit receiver couples to the conduit. In such a case, the sealing compound 566 can provide a barrier between the explosion-proof side of the cavity 530 and the non-explosion-proof side of the cavity 530.

Figure 6A:
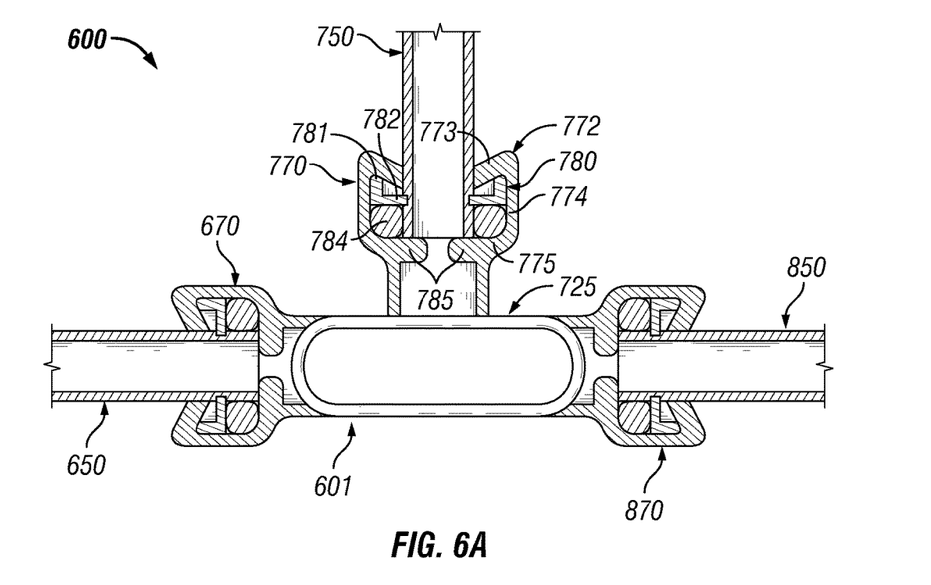
FIG. 6A shows a system that includes another enclosure with multiple conduit receivers prior to securing conduit in accordance with certain example embodiments.
Figure 6B:
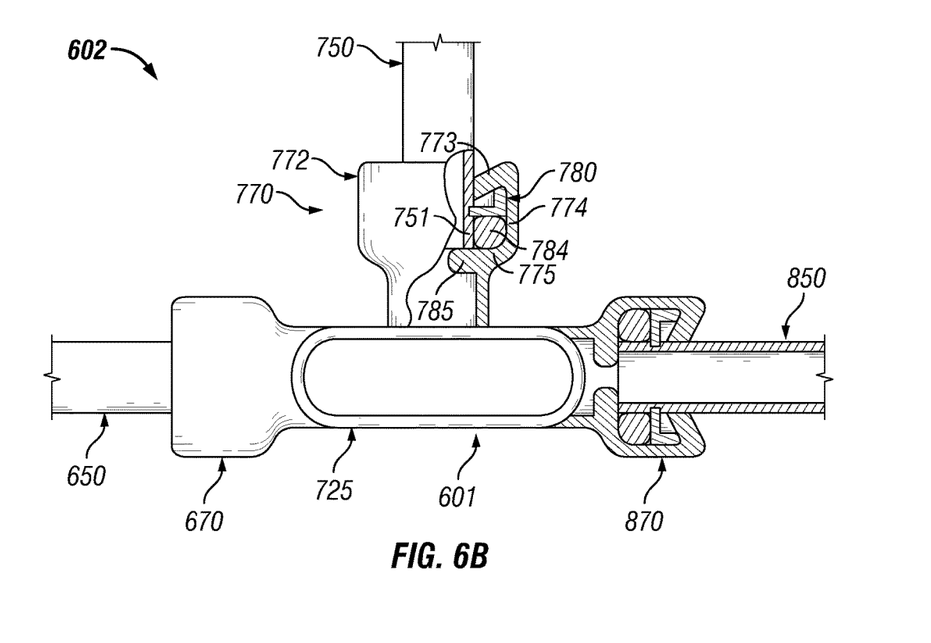
FIG. 6B shows the system of FIG. 6A after the conduit receivers secure the conduit in accordance with certain example embodiments.

FIG. 6A shows a semi-cross sectional side view of a conduit system 600 that includes another enclosure with multiple conduit receivers prior to securing conduit in accordance with certain example embodiments. FIG. 6B shows a semi-cross sectional side view of the conduit system 602 of FIG. 6A after the conduit receivers secure the conduit in accordance with certain example embodiments. In one or more embodiments, one or more of the components shown in FIGS. 6A and 6B may be omitted, added, repeated, and/or substituted. Accordingly, embodiments of conduit systems having example conduit receivers should not be considered limited to the specific arrangements of components shown in FIGS. 6A and 6B.

The description for any component (e.g., housing 772, bushing 785) of FIGS. 6A and 6B not provided below can be considered substantially the same as the description of the corresponding component (e.g., housing 272, bushing 285) described above with respect to FIGS. 2A-3B. The numbering scheme for the components of FIGS. 6A and 6B parallels the numbering scheme for the components of FIGS. 2A-3B in that each component is a three digit number, where components of the conduit system of FIGS. 6A and 6B and the corresponding components of the conduit receiver 270 of FIGS. 2A and 2B, the conduit system 300 of FIG. 3A, and the conduit system 302 of FIG. 3B have the identical last two digits.

Referring to FIGS. 1-6B, the enclosure 601 of FIGS. 6A and 6B includes three example conduit receivers (conduit receiver 670, conduit receiver 770, and conduit receiver 870). The enclosure 601 of FIGS. 6A and 6B has no traditional conduit receivers. The housing (e.g., housing 772) of each conduit receiver (e.g., conduit receiver 770) in FIGS. 6A and 6B is shaped slightly differently compared to the housing 272 of FIGS. 2A and 2B. Specifically, the end wall 773 makes an acute angle with the main wall 774 (as opposed to the substantially right angle formed between the end wall 273 and the main wall 274 of the housing 272 of the conduit receiver 270 of FIGS. 2A and 2B). Alternatively, the end wall can make an obtuse angle relative to the main wall of a housing of an example conduit receiver.

In addition, the conduit receivers of FIGS. 6A and 6B differ from the conduit receiver 270 of FIGS. 2A-3B in that there is no separating member. Instead, the sealing device (e.g., sealing device 784) of each conduit receiver (e.g., conduit receiver 770) in FIGS. 6A and 6B is positioned directly adjacent to the retaining element (e.g., retaining element 780) within the housing (e.g., housing 772). When the housing (e.g., housing 772) is compressed and deformed, the sealing device (e.g., sealing device 784) also becomes compressed between the conduit 750, the main portion 782 of the retaining element 780, the main wall 774, and the transition wall 775.

The systems and methods described herein may provide several advantages including a significant savings in time and material for installing, modifying, and/or maintaining a conduit system. This allows for less costly, easier, and quicker installation of conduit systems using example conduit receivers. Example embodiments also provide more flexibility in where enclosures having example conduit receivers are located in a conduit, enclosed raceway, and/or wiring system. Certain example embodiments provide a number of other benefits, as well, including but are not limited to use of fewer materials, simplified installation, simplified inspection, simplified maintenance, and reduced cost. For example, the labor associated with installing enclosed raceways that have threaded conduit and fittings (as in the current art) is higher than other portions of a cabling systems, such as cable tray and laying cable without cable tray or conduit. When enclosed raceways are used, example embodiments allow for lower the labor cost and time for installing enclosed raceways.

In addition, using a press connection of an example conduit receiver as opposed to mating threads, the enclosure to which the press connection is affixed and/or coupled to can rotate, eliminating the need for a union or similar component in a conduit system. Again, this simplifies installation, saves time, money and materials, and allows for increased flexibility in designing, installing, modifying, and/or maintaining a conduit system. Further, conduit can have a coating (e.g., zinc oxide) to protect the conduit (and the mating threads in particular) from corrosion. The NEC requires that where corrosion protection is necessary and conduit is threaded in the field, the threads should be coated with an approved electrically-conductive, corrosion resistant compound. When a conduit is cut to size and new mating threads are etched into the conduit, those new mating threads are not protected from corrosion because the new mating threads do not have the coating. Example embodiments allow conduit to be cut to size and still be protected from corrosion because the coating no etchings that can remove the coating are made to the conduit.

In addition, example embodiments help to protect the integrity of a flame path when example conduit receivers are part of an explosion-proof system. Since new mating threads do not need to be etched into a conduit, such as when a conduit is cut to a shorter length, burrs and shavings are not created, and so cannot interfere with a flame path defined by such mating threads. Further, regardless of whether an example conduit receiver is part of an explosion-proof system, the burrs and shavings that would otherwise be generated to etch mating threads do not risk the integrity of an electrical cable by scraping and/or puncturing the jacket of an electrical cable. In other words, example embodiments are free of metal burrs, metal shavings, and other objects that could scrape or puncture the jacket of an electrical cable pulled through and/or disposed within an example conduit receiver.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An enclosure, comprising:
at least one wall forming a cavity; and
a first conduit receiver disposed in the at least one wall, wherein the first conduit receiver comprises:
   a first housing having a first aperture, wherein the first aperture is configured to receive a first conduit, wherein the first conduit has disposed therein at least one electrical cable;
   a first retaining element disposed within the first housing at a first distal end of the first housing; and
   a first cable-protection element disposed adjacent to a first proximal end of the first housing, wherein the first cable-protection element extends inward from the at least one wall, wherein the first cable-protection element is configured to abut against the first conduit when the first conduit is received in the first aperture, and wherein the first cable-protection element covers a first end of the first conduit,
   wherein the first conduit receiver complies with applicable electrical raceway standards.

2. The enclosure of claim 1, wherein the first housing is made of malleable material, wherein the first housing is configured to be deformed when a first threshold compressive force is applied to the first housing.

3. The enclosure of claim 2, wherein the first retaining element is configured to deform at least a portion of the first conduit when the first threshold compressive force is applied to the first housing, and wherein the sealing device is configured to compress when the first housing is deformed.

4. The enclosure of claim 1, wherein the first conduit receiver further comprises:
   a first sealing device disposed with the first housing at the first proximal end of the first housing; and
   a separating member disposed within the first housing between the first retaining element and the first sealing device.

5. The enclosure of claim 1, further comprising:
   a second conduit receiver disposed in the at least one wall, wherein the second conduit receiver comprises:
      a second housing having a second aperture, wherein the second aperture is configured to receive a second conduit;
      a second retaining element disposed within the second housing at a second distal end of the second housing; and
      a second cable-protection element disposed adjacent to a second proximal end of the second housing, wherein the second cable-protection element extends inward from the at least one wall, wherein the second cable-protection element is configured to allow at least one second cable to be pulled through the second aperture without damaging the at least one second cable.

6. The enclosure of claim 1, further comprising:
   an enclosure aperture disposed in the at least one wall, wherein the enclosure aperture is positioned adjacent to the first conduit receiver, wherein the enclosure aperture is configured to receive at the least one first cable that is pulled through the first conduit, wherein the first cable-protection element further protects the at least one first cable from a first end of the first conduit; and
   a cover removably coupled to the at least one wall, wherein the cover covers the enclosure aperture, wherein the cover is removed to expose the enclosure aperture and allow a user to access the at least one first cable.

7. The enclosure of claim 1, wherein the first conduit has one of a range of sizes.

8. The enclosure of claim 1, wherein the cavity adjacent to the first conduit receiver is filled with a sealing compound to create an explosion-proof seal.

9. The enclosure of claim 1, wherein the first cable-protection element comprises a separate piece inserted into the first aperture.

10. A connector device, comprising:
    a body having a cavity that traverses therethrough, wherein the body comprises a first end, wherein the first end comprises:
       a first housing having a first aperture, wherein the first aperture is configured to receive a first conduit, wherein the first conduit has disposed therein at least one electrical cable;
       a first retaining element disposed within the first housing at a first distal end of the first housing; and
       a first cable-protection element disposed adjacent to the first proximal end of the first housing, wherein the first cable-protection element extends inward from the at least one wall, wherein the first cable-protection element is configured to allow at least one cable to be pulled through the first aperture without damaging the at least one cable, wherein the first cable-protection element is configured to abut against the first conduit when the first conduit is received in the first aperture, and wherein the first cable-protection element covers a first end of the first conduit.

11. The connector device of claim 10, wherein the first end further comprises a first sealing device disposed within the first housing at a first proximal end of the first housing.

12. The connector device of claim 11, wherein the first housing is made of malleable material, wherein the first housing is configured to be deformed when a first threshold compressive force is applied to the first housing, wherein the first retaining element is configured to deform at least a portion of the first conduit when the first threshold compressive force is applied to the first housing, and wherein the sealing device is configured to compress when the first housing is deformed.

13. The connector device of claim 11, wherein the first conduit receiver further comprises:
    a separating member disposed within the first housing between the first retaining element and the first sealing device.

14. The connector device of claim 10, wherein the body further comprises a second end, wherein the second end comprises mating threads, wherein the mating threads are configured to mechanically connect to complementary mating threads disposed on a second conduit.

15. The connector device of claim 10, wherein the body further comprises a second end, wherein the second end comprises:
    a second housing having a second aperture, wherein the second aperture is configured to receive a second conduit;
    a second retaining element disposed within the second housing at a second distal end of the second housing; and
    a second cable-protection element disposed adjacent to the second proximal end of the second housing, wherein the second cable-protection element extends inward from the at least one wall, wherein the second cable-protection element is configured to allow at least one cable to be pulled through the first aperture without damaging the at least one cable.

16. A system comprising:
    a first conduit having a first conduit end, wherein the first conduit has disposed therein at least one electrical cable;
    an enclosure coupled to the first conduit end of the first conduit, wherein the enclosure comprises:
       at least one wall forming a cavity; and
       a first conduit receiver disposed in the at least one wall, wherein the first conduit receiver comprises:
          a first housing having a first aperture, wherein the first aperture receives the first conduit end of the first conduit;
          a first retaining element disposed within the first housing at a first distal end of the first housing; and
          a first cable-protection element adjacent to a first proximal end of the first housing, wherein the first cable-protection element extends inward from the at least one wall, wherein the first cable-protection element is configured to allow the at least one electrical cable to be pulled through the first aperture without damaging the at least one electrical cable, wherein the first cable-protection element abuts against and covers a distal end of the first conduit end; and
    a tool that applies a compressive force to the first housing of the first conduit receiver, wherein the compressive force deforms the first housing and drives the first retaining element against the first conduit end.

17. The system of claim 16, wherein the first conduit receiver further comprises:
   a first sealing device disposed within the first housing at the first proximal end of the first housing; and
   a separating member disposed within the first housing between the first retaining element and the first sealing device, wherein the separating member aligns the first retaining element when the first retaining element is driven against the first conduit end, and wherein the separating member remains stationary to compress the sealing device when the first housing is deformed.

18. The system of claim 16, wherein the first conduit, the first retaining element, and the first housing are electrically conductive.

19. The system of claim 16, further comprising:
   a sealing compound disposed in the cavity adjacent to the first conduit receiver, wherein the sealing compound creates an explosion-proof seal.

20. The system of claim 16, further comprising:
   a second conduit having a second conduit end,
   wherein the enclosure further comprises a second conduit receiver disposed in the at least one wall, wherein the second conduit receiver comprises:
      a second housing having a second aperture, wherein the second aperture receives the second conduit end of the second conduit;
      a second retaining element disposed within the second housing at a second distal end of the second housing;
      a second sealing device disposed within the second housing at a second proximal end of the second housing; and
      a second cable-protection element adjacent to the second proximal end of the second housing, wherein the second cable-protection element extends inward from the at least one wall, wherein the second cable-protection element is configured to allow the at least one electrical cable to be pulled through the first aperture without damaging the at least one electrical cable.

* * * * *